United States Patent [19]

Elhaus et al.

[11] Patent Number: 5,031,437
[45] Date of Patent: Jul. 16, 1991

[54] APPARATUS FOR PULLING EXTRUSIONS FROM A PRESS

[75] Inventors: Friedrich-Wilhelm Elhaus, Moos; Eckhard Mäkel, Velbert, both of Fed. Rep. of Germany

[73] Assignee: Elhaus Industrieanlagen GmbH, Rielasingen, Fed. Rep. of Germany

[21] Appl. No.: 528,733

[22] Filed: May 23, 1990

[30] Foreign Application Priority Data

May 24, 1989 [DE] Fed. Rep. of Germany ....... 3917002

[51] Int. Cl.$^5$ ............................................. B21C 35/02
[52] U.S. Cl. .................................................... 72/257
[58] Field of Search .................................. 72/257, 422

[56] References Cited

U.S. PATENT DOCUMENTS

| 4,307,597 | 12/1981 | Elhaus et al. | 72/257 |
| 4,507,950 | 4/1985 | Elhaus | 72/257 |
| 4,628,719 | 12/1986 | Best | 72/257 |
| 4,635,459 | 1/1987 | Elhaus | 72/257 |
| 4,873,857 | 10/1989 | Giancarlo | 72/257 |
| 4,953,381 | 9/1990 | Visser | 72/422 |

FOREIGN PATENT DOCUMENTS

| 1153321 | 8/1963 | Fed. Rep. of Germany . | |
| 1452374 | 2/1969 | Fed. Rep. of Germany | 72/257 |
| 1299589 | 7/1969 | Fed. Rep. of Germany | 72/257 |
| 3040236 | 5/1982 | Fed. Rep. of Germany | 72/257 |

Primary Examiner—Robert L. Spruill
Attorney, Agent, or Firm—Willian Brinks Olds et al.

[57] ABSTRACT

An apparatus for pulling extrusions from a press, comprising two pullers (5,6) which alternatingly pull the extruded product (3) along an extrusion path and each are equipped with a separator (16) that moves along, and further comprising a cross-transfer conveyor (8) which conveys the extruded products upon separation in a direction transversely of the extrusion direction (F) for further processing, is characterized in that puller heads of the pullers (5,6) are designed to be movable transversely out of the extrusion path (2) for lateral shifting of the clamped extruded product by a cross-drive.

12 Claims, 2 Drawing Sheets

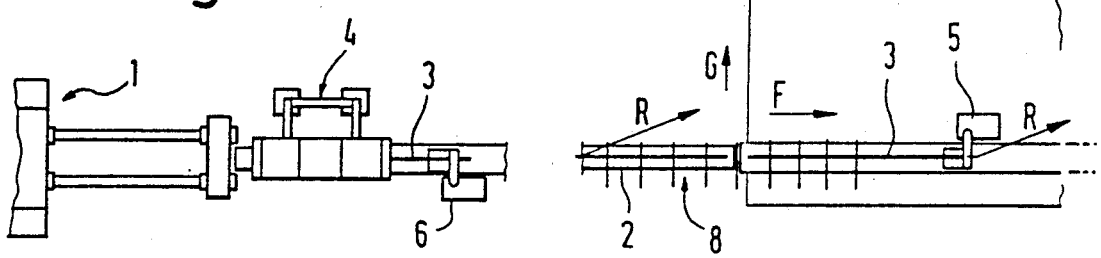
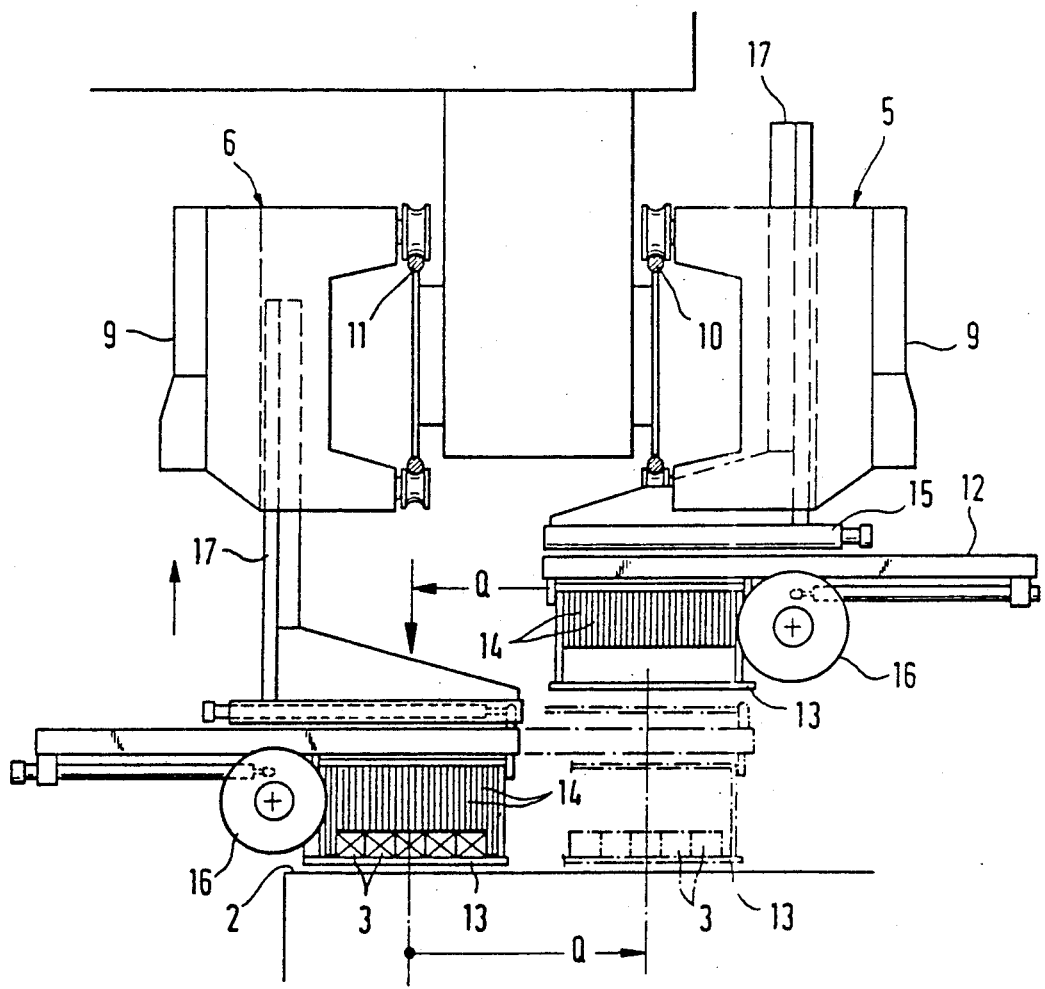

APPARATUS FOR PULLING EXTRUSIONS FROM A PRESS

FIELD OF THE INVENTION

The instant invention relates to an apparatus for pulling extruded products from a press, especially extrusions of aluminum or aluminum alloys, comprising two pullers which alternatingly pull the products extruded by the press along an extrusion path, grasping the extruded product each by a puller head adapted to be moved close to the product, and further comprising at least one separator which severs the moving extruded product. Once severed, the extruded products are conveyed by a cross-transfer conveyor in a direction transversely of the extrusion direction for further processing.

BACKGROUND OF THE INVENTION

Such an apparatus may be of different designs, as follows:

1. Two pullers each are equipped with a separator which moves along and both pullers alternatingly cover the entire extrusion path, being operative alternatingly.

2. Once more two pullers are provided which operate across the entire extrusion path. Yet there is only one separator which is stationary and apart from the pullers. Its separating tool is moved along with the extruded product for "flying" separation.

3. Two pullers are provided, the first one being moved only through one half of the extrusion path, while the second one pulls the extruded product through the other half of the extrusion path. Only the first puller is furnished with a separator that moves along.

With all these apparatus there is the difficulty of having to move the extruded product after the severing in crosswise direction to clear the extrusion path for further processing, while the other puller already has grasped the leading end of the next extruded product and is moving ahead on the extrusion path. That causes the risk of collision with the extruded product upon separation and with the cross-transfer conveyor.

To avoid such collisions, in the known apparatus the extrusion velocities are limited to small values which are lower than the extrusion velocities actually attainable by the press and the puller device.

SUMMARY OF THE INVENTION

It is an object of the invention to remedy that and devise an apparatus of the kind specified initially such that work can be done at maximum extrusion velocities.

To solve the problem, it is provided in an apparatus of the kind defined initially that the puller heads of each puller are designed to be movable transversely by a cross-drive means to shift the clamped extruded product laterally out of the extrusion path.

Preferably, the transverse movement of each puller head can be superimposed over the movement of the puller in extrusion direction, the velocity component of this movement in extrusion direction being at least equal to the extrusion velocity of the extruded product.

For particularly reliable prevention of the risk of collision when the extrusion velocity equals the velocity component of the speed of removal of the extruded product, upon separation, in extrusion direction, another modification of the invention provides for the severed extruded product to be moved away at elevated speed before actuation of the cross-drive means so as to create a distance in extrusion direction between the trailing end of the extruded product and the leading end of the next successive extruded product.

An apparatus according to the invention makes sure that immediately after the separation the respective puller in operation removes the extruded product from the extrusion path by a combined movement in extrusion direction and in a direction transversely thereof. This will make room in the extrusion path for the next extruded product already grasped by the other puller. In this manner the risk of collision is eliminated even at high extrusion velocity.

The invention will display its full effect if the cross-transfer conveyor is operated at the same time that the transverse movement of the puller head, superimposed over the extruding, takes place. The cross-transfer conveyor also conveys the parts of the extruded product remote from the clamped end in a direction transversely of the extrusion direction.

The cross-transfer conveyor may be of conventional design (U.S. Pat. No. 4,507,950). For use with the invention, however, the known cross-transfer conveyor preferably is modified such that those parts of the extrusion path which support the extruded product are lowered prior to actuation of the cross-transfer conveyor. This device is particularly well suited for use with the invention for yet another reason, namely because the extent and velocity of the transverse movement of products conveyed by the cross-transfer conveyor are adjustable. That facilitates the necessary harmonization between the transverse movements of the puller head and of the cross-transfer conveyor.

Further objects and advantages will become apparent from the following description and the accompanying drawings.

BRIEF DESCRIPTION OF THE DRAWING

The invention will be described further, by way of example, with reference to the accompanying drawings, in which:

FIG. 1 is a diagrammatic overall view of a press with downstream extrusion path, puller means, and other devices;

FIG. 4 presents the puller means according to the invention, as seen against the extrusion direction, showing one puller in operative position and the other puller in inoperative position.

Figure 2:
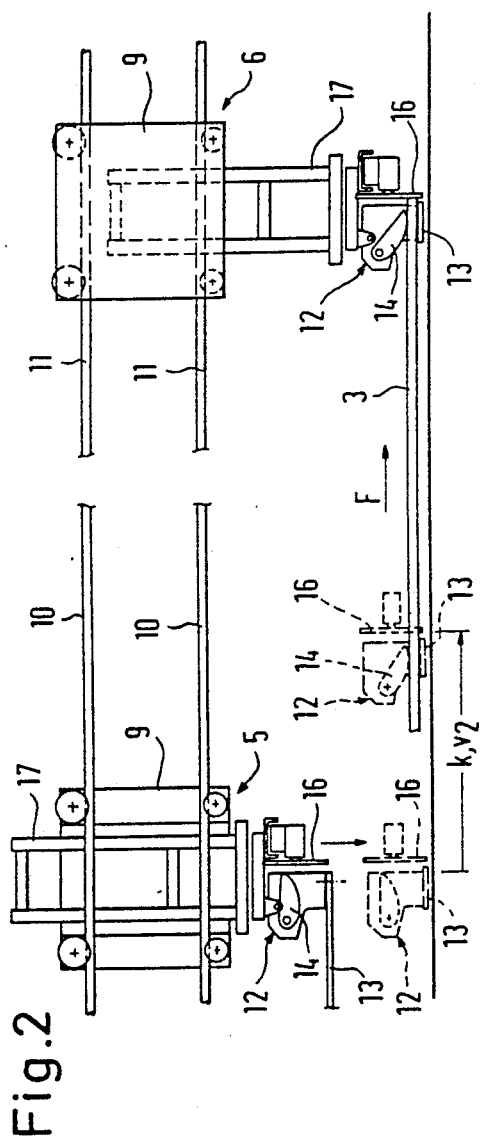
FIGS. 2 and 3 show a puller means according to the invention in an enlarged side elevation and top plan view, respectively.

The preferred embodiments of the present invention will hereinafter be described in detail with reference to the accompanying drawings.

DESCRIPTION OF THE PREFERRED EMBODIMENT

In the general view of FIG. 1 reference numeral 1 designates a press which is followed by an extrusion path 2 for an extruded product 3. A water quenching device 4 is arranged directly behind the mouth of the press. Two pullers which alternatingly pull the extruded product from the press are marked by reference numerals 5 and 6. A cooling bed 7 is arranged beside the extrusion path 2, and a cross-transfer conveyor 8 moves the extruded products 3 upon severing transversely of the extrusion direction F toward the cooling bed 7 in direction G.

Figure 3:
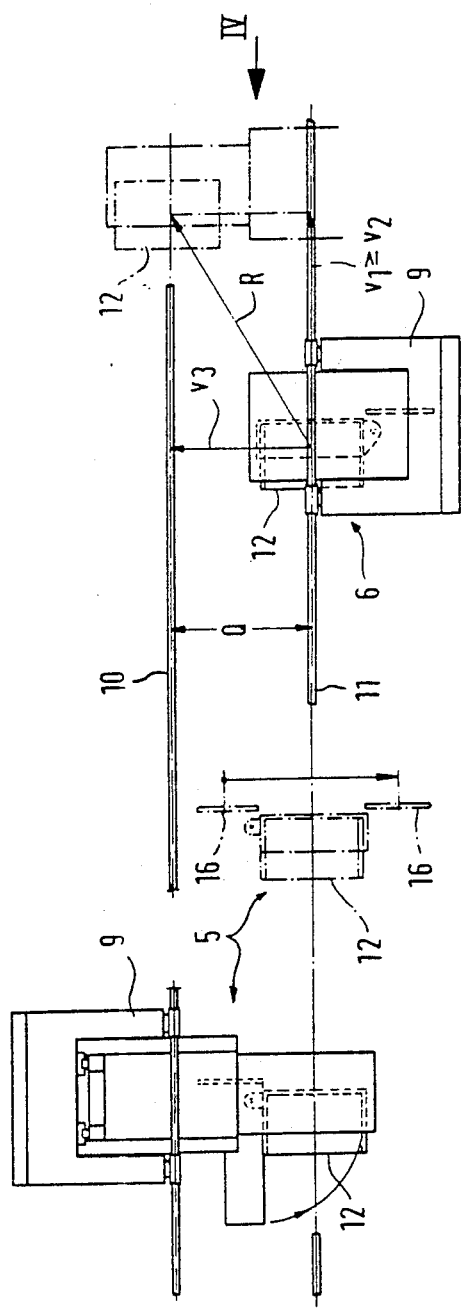

The specific structure and mode of operation of the two pullers are shown in FIGS. 2 to 4. Each puller 5, 6, has its own carriage 9 running on two rails 10, 11, one above the other, above the extrusion path 2.

Furthermore, each puller comprises a puller head 12 having a clamping jaw 13 and clamping lamina 14, the puller head 12 being displaceable by a pressure fluid cylinder 15 in direction G transversely of the puller means. Likewise mounted on each puller head 12 is a separator saw 16 which is also movable transversely of the extrusion direction F. The clamping jaw 13 is adapted to be swung laterally out of the extrusion path to permit the puller head 12 to be lowered on to the extruded product 3.

The puller heads 12 each are carried by a support structure 17 which is adapted to be shifted vertically with respect to the carriage 9. The left half of FIG. 2 and the right half of FIG. 4 illustrate the raised, inoperative position of a puller, while the lowered, operative position is shown in discontinuous lines in the left half of FIG. 2 and in continuous lines in the right hand of FIG. 2 and also in full lines in FIG. 4, left side.

The puller head 12 of puller 5 is lowered in order to grasp the leading end of an extruded product. The clamping jaw 13 is swung into the extrusion path below the extruded product 3. In the distance marked k, the puller head 12 is accelerated, coordinated with the velocity of the extruded product, and clamped to the same. The pull changes from puller 6 to puller 5, and the extruded product is severed by the separator saw 16 of puller 5.

Upon separation of the extruded product, the pressure fluid cylinder 15 of puller 6 is operated to generate transverse movement of the puller head 12 of puller 6 which movement is superimposed over the extruding motion of puller 6. At the same time, the cross-transfer conveyor 8 is actuated such that the whole extruded product is moved simultaneously in directions G and F, at a resultant of movement R indicated in FIG. 3, to clear the extrusion path 2. In this manner not only the leading end of the extruded product at the puller 6 but also the remainder of the extruded product are conveyed in transverse direction at a cross-transfer velocity $V_3$. That causes the extruded product 3 to slide at a velocity component $V_1$ across parts of the cross-transfer conveyor 8. In this context $V_1$ must be selected according to the equation $V_1 \geq V_2$, wherein $V_2$ is the extrusion velocity (see FIG. 2). This movement by one transverse stroke Q carried out by the separated extruded product clears the extrusion path for reception of the leading end of the next extruded product by means of puller 5.

Before the cross movement described above is initiated, the puller 6 may be moved briefly at elevated speed in extrusion direction so as to obtain a distance, upon separation, between the severed trailing end of the extruded product and the leading end of the next successive extruded product. That makes sure that collision will be avoided.

While this invention has been shown and described in connection with preferred embodiments, it is apparent that certain changes and modifications, in addition to those mentioned above, may be made from the basic features of the present invention. Accordingly, it is the intention of the Applicants to protect all variations and modifications within the true spirit and valid scope of the invention.

What is claimed is:

1. An apparatus for pulling an extruded product from a press along an extrusion path and severing the extruded product to produce a separated portion comprising:

a first puller having a puller head including first means for grasping an extruded product, first means mounted on said first puller for severing an extruded product into an extrusion portion and a separate portion, and first cross-drive means mounted on said first puller for moving the first puller head in a direction transverse to the extrusion path to assist in moving the separate portion of the extruded product away from and transverse to the extrusion path;

a second puller having a puller head including second means for grasping an extruded product, second means mounted on said second puller for severing an extruded product into an extrusion portion and a separate portion, and second cross-drive means mounted on said second puller for moving the second puller head in a direction transverse to the extrusion path to assist in moving the separated portion of the extruded product away from and transverse to the extrusion path;

a cross-transfer conveyor located at least partially under the extrusion path to assist in conveying the separated portion of the extruded product away from and transverse to the extrusion path while one of the cross-drive means is operating; and means for moving said first puller and said second puller alternately along the extrusion path such that an extruded product is pulled from the press and severed into an extrusion portion and a separated portion.

2. An apparatus according to claim 1 wherein the transverse movement of the first puller head and the second puller head can be superimposed over the movement of said first puller and said second puller in the extrusion direction, said movement in the extrusion direction having a velocity at least equal to the velocity at which the extruded product exits the press.

3. An apparatus according to claim 2 wherein the velocity and distance of transverse movement of the first puller head and the second puller head by the first cross-drive means and the second cross-drive means is harmonized with the velocity and distance of transverse movement of said cross-transfer conveyor.

4. An apparatus according to claim 1 wherein the transverse movement of the first puller head and second puller head accomplished by the first cross-drive means and the second cross-drive means is synchronized with the movement of said cross-transfer conveyor.

5. An apparatus according to claim 1 further including support for the extruded product along the extrusion path and wherein said supports are designed to be lowered before actuation of the cross-transfer conveyor.

6. An apparatus according to claim 1 wherein the puller head which is pulling the separated portion of the extruded product increases its velocity in the extrusion direction so that the puller head is moving faster than the velocity at which the extruded product exits the press before the puller head is moved in a transverse direction by the cross-drive means.

7. An apparatus according to claim 1 wherein the first cross-drive means operates during the movement of said first puller along the extrusion path and the second cross-drive means operates during the movement of said second puller along the extrusion path, and wherein said first puller and said second puller are controlled such that their speed along the extrusion path during the operation of the cross-drive means is at least equal to the speed at which the extruded product exits the press.

8. A method of alternately pulling an extruded product from a press along an extrusion path and severing the extruded product to produce a separate portion, comprising the steps of:

grasping a first emerging end of an extruded product by a first puller having means for grasping;

pulling the extruded product along the extrusion path by said first puller;

grasping a second emerging end of the extruded product by a second puller having means for grasping at a distance from said first puller;

severing the extruded product into a separated portion and an extrusion portion by severing means mounted on said second puller;

moving the separated portion in a direction transverse to the extrusion path by a cross-drive means mounted on said first puller wherein the cross-drive means moves a puller head on said first puller in a direction transverse to the extrusion path;

releasing the separated portion onto a cross-transfer conveyor which supports and conveys the separated portion away from the extrusion path, said cross-transfer conveyor located at least partially under the extrusion path; and alternating the pulling action of said first and said second pullers so that after said first puller removes the separated portion from the extrusion path it returns to a position near the press and grasps a third emerging end of an extruded product at a distance from said second puller and severs the product into the separated and extrusion portions wherein said second puller pulls the separated portion and said first puller pulls the extrusion portion.

9. A method according to claim 8 wherein the transverse movement of the first puller head and the second puller head accomplished by the first cross-drive means and the second cross-drive means is synchronized with the movement of said cross-transfer conveyor.

10. A method according to claim 8 wherein the extent and velocity of the transverse movement of the first puller head and the second puller head accomplished by the cross-drive means is harmonized with the transverse movement of the cross-transfer conveyor.

11. A method according to claim 8 lowering the separated portion of the extruded product below the extrusion path before said cross-transfer conveyor is operated.

12. A method according to claim 8 further comprising:

pulling the separated portion along the extrusion path at a velocity greater than the velocity at which the extruded product exits the press before moving the separated portion in a direction transverse to the extrusion path.

* * * * *

UNITED STATES PATENT AND TRADEMARK OFFICE
CERTIFICATE OF CORRECTION

PATENT NO. : 5,031,437

DATED : July 16, 1991

INVENTOR(S) : Friedrich-Wilhelm Elhaus, et al.

It is certified that error appears in the above-identified patent and that said Letters Patent is hereby corrected as shown below:

In column 3, line 2, please delete "Each puller 5, 6,"; and in line 3, before "has" start a new paragraph beginning with --Each puller 5, 6--.

IN THE CLAIMS

In claim 1, line 9, please delete "separate" and substitute therefor --separated--; in line 12, please delete "separate" and substitute therefor --separated--; and in line 19, please delete "separate" and substitute therefor --separated--.

In claim 8, line 3, please delete "separate" and substitute therefor --separated--.

Signed and Sealed this

Ninth Day of February, 1993

Attest:

STEPHEN G. KUNIN

Attesting Officer

Acting Commissioner of Patents and Trademarks